United States Patent
Hullegien et al.

(10) Patent No.: US 6,705,592 B2
(45) Date of Patent: Mar. 16, 2004

(54) CLOSURE FOR A CONTAINER TO BE PRESSURIZED, AS WELL AS SUCH A CONTAINER

(75) Inventors: Andreas Hubertus Hullegien, Vleuten (NL); Willem Terpstra, Zeewolde (NL)

(73) Assignee: Dispense Systems International B.V., Hilversum (NL)

(*) Notice: Subject to any disclaimer, the term of this patent is extended or adjusted under 35 U.S.C. 154(b) by 87 days.

(21) Appl. No.: 10/161,081

(22) Filed: May 30, 2002

(65) Prior Publication Data

US 2003/0006393 A1 Jan. 9, 2003

(30) Foreign Application Priority Data

Jun. 1, 2001 (NL) .............................. 1018206

(51) Int. Cl.$^7$ ..................... F16K 51/00; F16L 29/00; F16L 37/28
(52) U.S. Cl. ............................. 251/149.6; 137/315.27
(58) Field of Search ................. 251/149.6; 137/15.07, 137/15.18, 315.27, 315.33, 212, 322; 222/400.7, 399

(56) References Cited

U.S. PATENT DOCUMENTS

| | | | |
|---|---|---|---|
| 3,228,413 A | | 1/1966 | Stevens, Jr. .................. 137/322 |
| 3,439,844 A | | 4/1969 | Johnston ...................... 222/398 |
| 3,939,860 A | | 2/1976 | Golding ........................ 137/212 |
| 4,715,414 A | * | 12/1987 | Harrison et al. ............. 141/302 |
| 5,526,965 A | * | 6/1996 | Degenkolbe et al. ...... 222/400.7 |
| 6,089,415 A | * | 7/2000 | Terpstra et al. ............. 222/397 |

FOREIGN PATENT DOCUMENTS

| | | |
|---|---|---|
| DE | 1 147 502 B | 11/1962 |
| DE | 26 24 172 B | 4/1977 |
| GB | 2 117 840 A | 10/1983 |
| WO | 99/07632 | 2/1999 |

* cited by examiner

Primary Examiner—Edward K. Look
Assistant Examiner—John K. Fristoe, Jr.
(74) Attorney, Agent, or Firm—Ladas & Parry

(57) ABSTRACT

The invention relates to a closure for a container to be pressurized, comprising a housing to be fixed to the container, in which a passage is present, whilst a seat is arranged in said passage, which seat is intended to mate with a closing element, which is urged in the direction of the seat by means of a coil spring surrounding said closing element, said the coil spring being confined between a part of the closing element and a few spaced-apart projections formed in one piece with the housing, which are connected to the remaining part of the housing by means of a few spaced-apart arms, said coil spring and said projections being capable of resilient deformation relative to each other, in such a manner that the spring can be moved past the projections in its position of use. The closure is provided with two diametrically opposite projections formed on the inner circumference of a ring-shaped element being in one piece with said projections, which ring-shaped element is connected to the remaining part of the housing via two diametrically opposite arms located between the projections, seen in the direction of the central axis of the housing, whilst one end of the spring is directly supported on said projections. The invention furthermore relates to a container and to a closure apparently intended for use with said container.

11 Claims, 7 Drawing Sheets

CLOSURE FOR A CONTAINER TO BE PRESSURIZED, AS WELL AS SUCH A CONTAINER

DESCRIPTION

The invention relates to a closure for a container to be pressurised, comprising a housing to be fixed to the container, in which a passage is present, whilst a seat is arranged in said passage, which seat is intended to mate with a closing element, which is urged in the direction of the seat by means of a coil spring surrounding said closing element, said coil spring being confined between a part of the closing element and a few spaced-apart projections formed in one piece with the housing, which are connected to the remaining part of the housing by means of a few spaced-apart arms, said coil spring and said projections being capable of resilient deformation relative to each other, in such a manner that the spring can be moved past the projections in its position of use.

Such a closure is known from U.S. Pat. No. 3,939,860. In said known construction, the arms and the projections formed on the lower ends of the arms are separated from each other by gaps extending between said arms.

The projections support a ring, on which the lower end of the spring is supported. In order to prevent undesirable pivoting of the arms, a ring is arranged round the ends of the arms, which ring is accommodated in grooves formed in the ends of the arms.

According to the invention, the closure is provided with two diametrically opposite projections formed on the inner circumference of a ring-shaped element being in one piece with said projections, which ring-shaped element is connected to the remaining part of the housing via two diametrically opposite arms located between the projections, seen in the direction of the central axis of the housing, whilst one end of the spring is directly supported on said projections.

By using the construction according to the invention, a closure of simple design can be obtained, which is built up of fewer individual parts than the closure which is known from U.S. Pat. No. 3,939,860 and which is easy to fit.

It is noted that from WO 99/07632 there is known a closure in which a coil spring surrounding the closing element is accommodated in a housing, which housing is provided with a flange at its bottom end for supporting the lower end of the spring. One drawback of this construction is the fact that a special tool must be used for fitting the spring, which tool is to deform the spring in such a manner that it can be placed into the housing via the passage formed in the housing, which can be closed by means of the closing element.

With the closure according to the invention, the fitting of the coil spring is further facilitated in that the facing boundary surfaces of the projections slope upwards from their free ends in the direction of the seat over part of their height.

The use of a coil spring having a conical configuration, in which the winding at the end of the coil spring remote from the seat is the largest winding of the coil spring, makes it possible to introduce at least a large part of the coil spring into the space present between the arms without there being a need to deform the ring-shaped element and the projections supported by said ring-shaped element.

A proper guidance of the closing element is obtained in that the closing element is provided with a shell-shaped member surrounded by the coil spring, which member includes a flange which is slidably accommodated with a tight fit in the ring-shaped element.

When the shell-shaped member is provided with a flanged collar at its end facing towards the seat, said shell-shaped member can also be utilised for supporting one end of the coil spring.

Partially on account of the conical configuration of the coil spring, the coil spring is easy to fit on the closing element, because the coil spring can be moved past the collar onto the shell-shaped member under resilient deformation of at least the coil spring that abuts against the collar in the mounted position of the coil spring.

The invention furthermore relates to a container comprising a housing of a closure present in an opening formed in the container and extending at least partially outside said container and mounted to said container, in which a closing element mating with a seat arranged in the centre of the housing is present, which closing element is accessible via the open upper end of the housing so as to be forced open by a tapping mechanism upon connection of the tapping mechanism to the container.

Such containers, which are generally used for beer or soft drinks, can be derived from Dutch patent applications Nos. 1008828 and 1014078. In these known constructions, the containers are provided with necks closing the openings, which necks are arranged on the outer side of the containers, which necks are generally welded to the container. In these known constructions, the closure is inserted into the container through the open upper end of the neck, and the housing of the closure is secured in position in the neck, for example by means of a threaded connection or by means of a bayonet connection, possibly in co-operation with a locking ring.

The above construction requires a costly machining operation on at least the interior of the neck and the exterior of the housing, so as to ensure a proper connection of the housing to the neck, wherein furthermore provisions rust be made to prevent the closure from moving out of the container unintentionally under the influence of the prevailing pressure in the container.

According to the invention, the housing of the closure is provided with a projecting flange at the end remote from the open upper end of the housing, whose boundary surface facing towards the open upper end of the housing extends at least in part away from said open upper end, seen in the direction of the outer circumference of the flange, wherein said boundary surface of the flange abuts against the inner side of the correspondingly configured wall portion surrounding the opening that is present in the container.

When using the construction according to the invention, the housing of the closure can be passed through the opening in the container from the inside, and the flange formed on one end of the housing will come to abut against the inner wall of the keg. The housing can be fixed to the container by means easy to fit which engage the part of the housing that projects the container, with the flange that abuts against the inner wall of the container preventing the closure from moving out of the container in some way or other under the influence of the prevailing pressure in the container, so that a simple and very safe construction can be obtained.

It is noted that from U.S. Pat. No. 3,228,413 there is known a container which comprises a valve housing containing two valves, which is positioned within the keg in its entirety. An extension piece provided with passages, which is passed through a neck of the container, is attached to said valve housing. The passages in the extension piece are intended for passage therethrough of tappets for actuating the valves. This known construction is complicated and expensive.

The invention will be explained in more detail hereinafter by means of possible embodiments of the construction according to the invention which are illustrated in the accompanying Figures.

Figure 7:
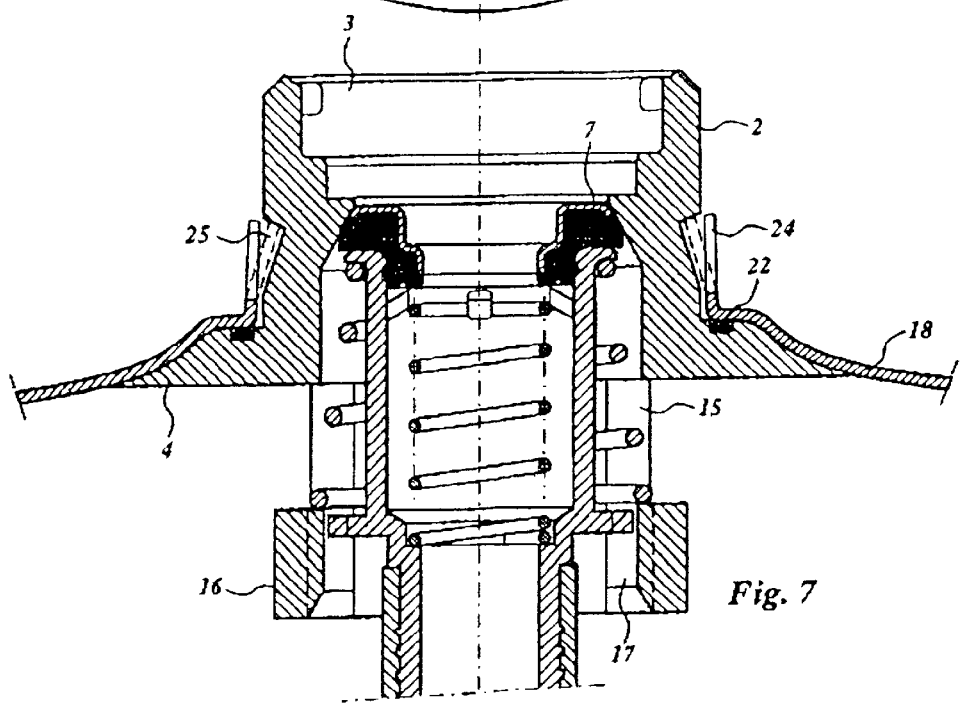
FIG. 7 shows an embodiment corresponding to the embodiment of FIG. 1, in which the closure is fixed in the container by means other than those which are used in FIG. 1, however.
Figure 9:
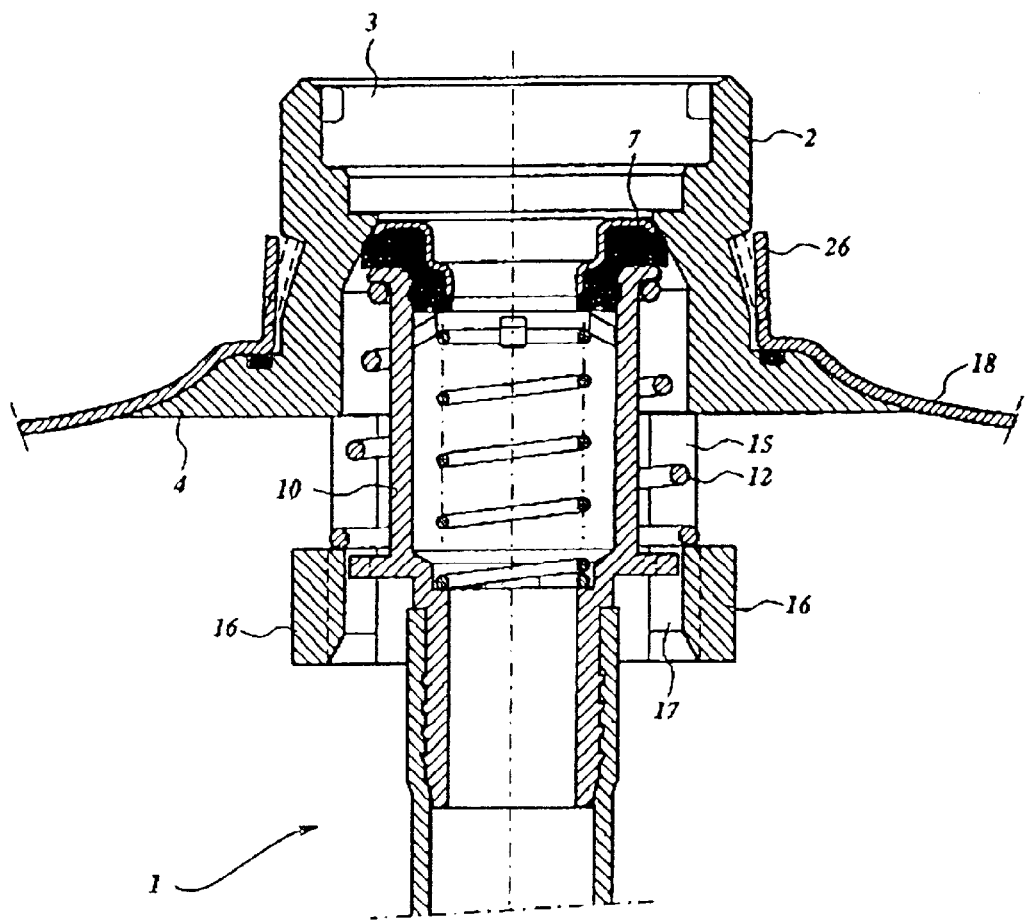

FIG. 9 the shows an embodiment which largely corresponds to the embodiment of FIG. 7.

FIG. 10 is a larger-scale view of a part of the container of FIG. 9.

The description below is based on a vertical position of the closure as shown in the drawings. It will be understood, however, that the closure may also occupy a different position.

Figure 1:
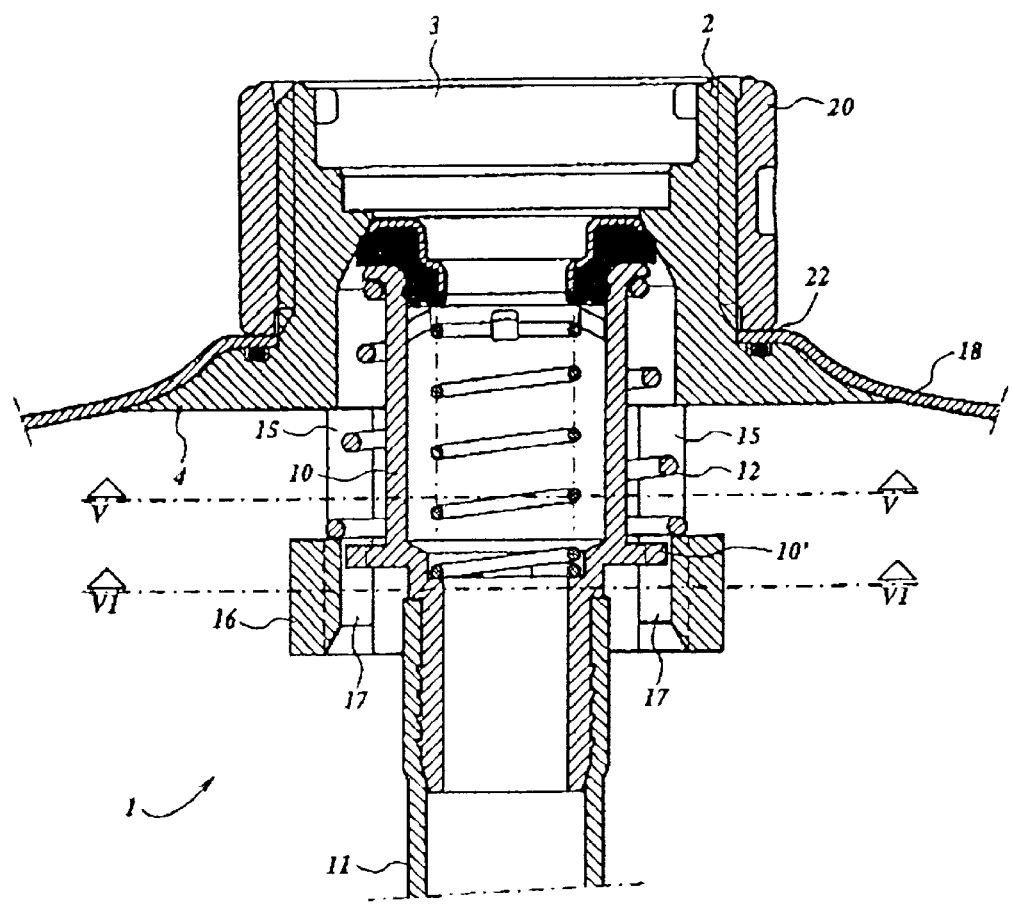
FIG. 1 is a sectional view of a closure fitted in a container (partially shown).
Figure 2:
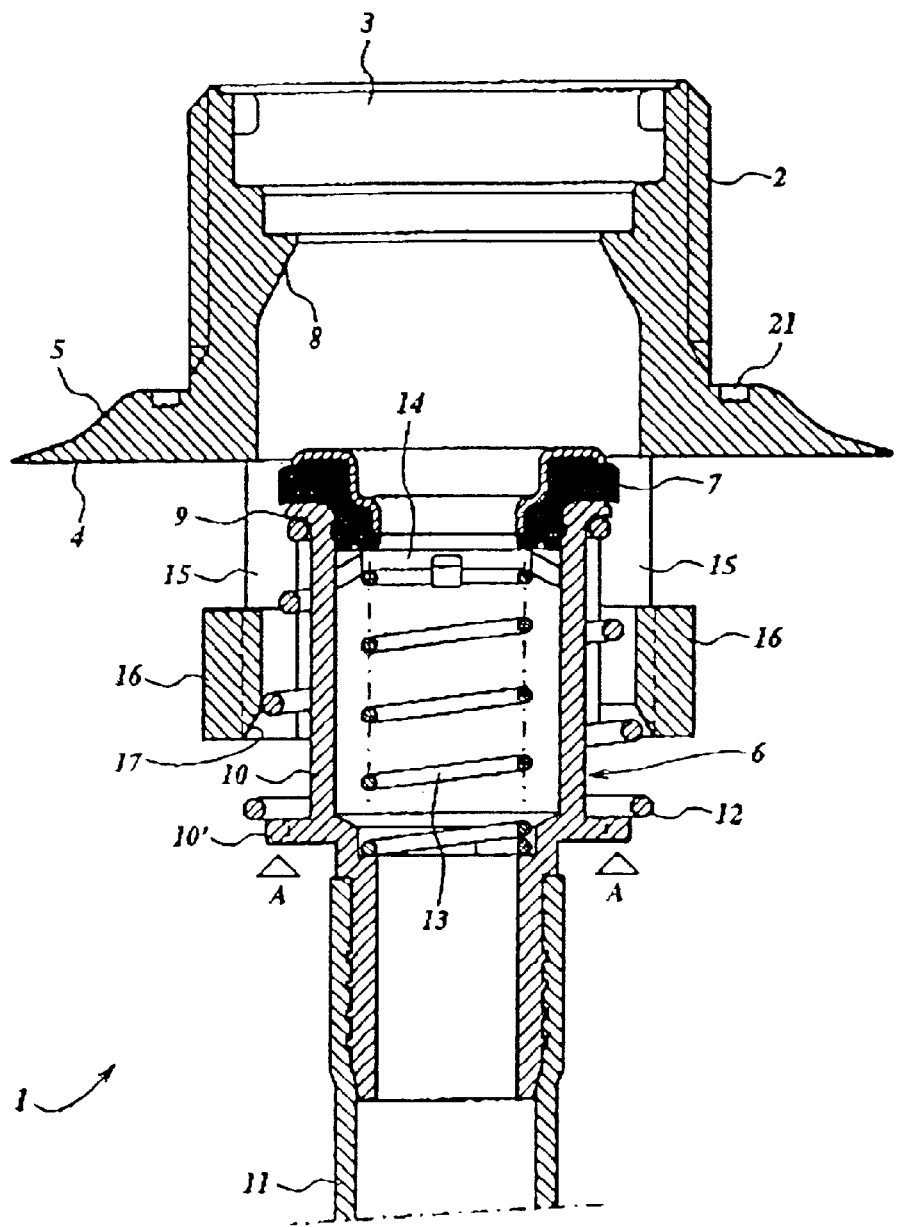
FIG. 2 is a sectional view of the parts of the closure that is shown in FIG. 1, which parts are shown in spaced-apart relationship.
Figure 3:
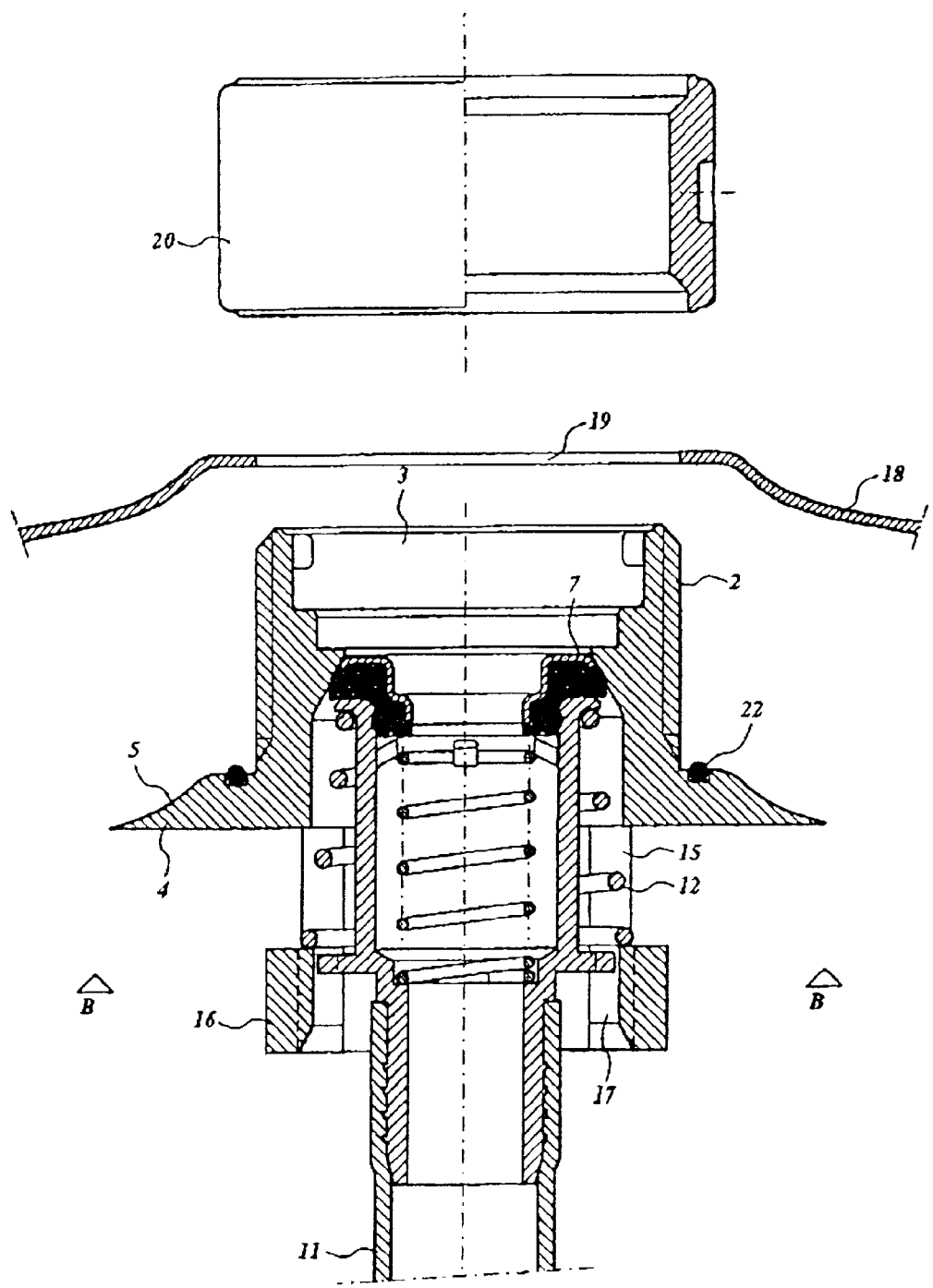
FIG. 3 shows the manner in which the closure according to FIGS. 1 and 2 can be fitted in the container.
Figure 4:
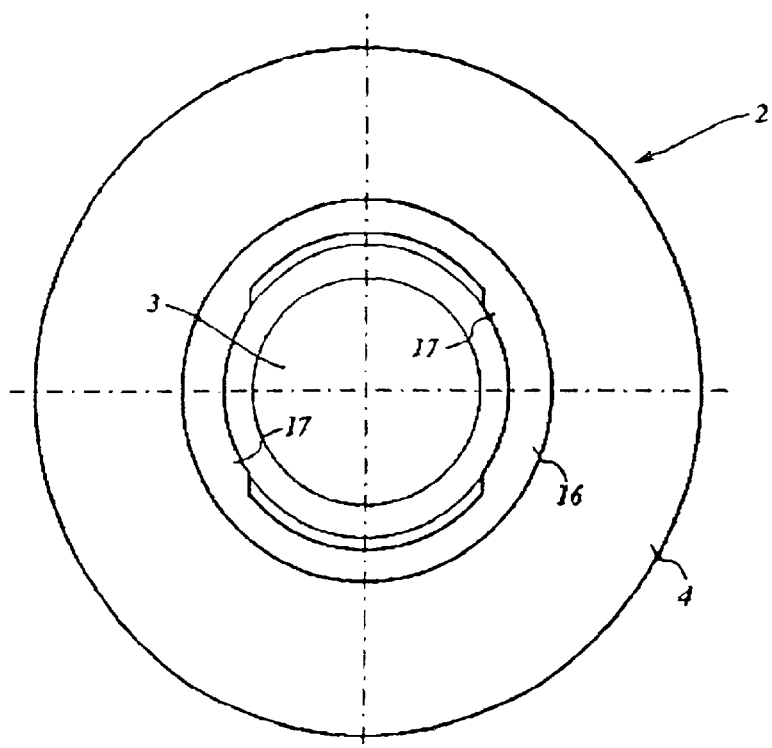
FIG. 4 is a bottom plan view of the housing of the closure.

FIGS. 1–3 show a closure 1 comprising a cylindrical housing 2, which is provided with screw thread on the outer circumference thereof.

A stepped passage 3 is present in the housing 2.

At the end of the housing 2 remote from the open upper end thereof, the housing is provided with a flange 4 formed in one piece with the housing. As will be apparent in particular from FIG. 2, the lower boundary surface of the flange 4, seen in FIG. 2, extends perpendicularly to the central axis of the housing 2 and of the passage 3.

The first part of the upper boundary surface 5, seen in FIG. 2, of the projecting flange 4 likewise extends perpendicularly to the central axis of the housing 2 and of the passage 3, with the next part, seen in the direction of the outer circumference of the flange, extending in a direction away from the open end of the housing towards the bottom side of the flange 4, seen in FIG. 2. The surface 5 has a more or less dome-shaped configuration, therefore.

Present in the housing 2 of the closure is a closing element 6, which is provided with an elastomeric ring 7, which is intended to mate with a seat formed by a conical wall portion 8 of the bore 3. The elastomeric element 7 is supported on a flanged upper end 9 of a shell-shaped member 10, which forms part of the closing element 6. A down-tube 11 is fixed to the lower end of the shell-shaped member 10. Confined between the flanged end 9 of the shell-shaped member 10 and a projecting flange 10' arranged on the outer circumference of the shell-shaped member is a coil spring 12 surrounding the shell-shaped member, which coil spring 12 is supported on the flange 10' with one end in the unassembled condition of the closure, as is shown in FIG. 2. The coil spring 12 has a conical configuration in the illustrated embodiment, such that the winding of the coil spring 12 that abuts against the flange 10' in FIG. 2 has the largest diameter and the winding of the coil spring that abuts against the flange edge 9 has the smallest diameter. Upon fitting of the spring 12 over the shell-shaped member 10, the winding of the spring that abuts against the flanged edge 9 will snap over the edge 9 under resilient deformation of said winding. The spring 12 is easy to fit on the shell-shaped member, therefore.

Furthermore present in the interior of the shell-shaped member is a spring 13, by means of which a spring dish 14 is pressed against the underside of the elastomeric ring 7.

Figure 5:
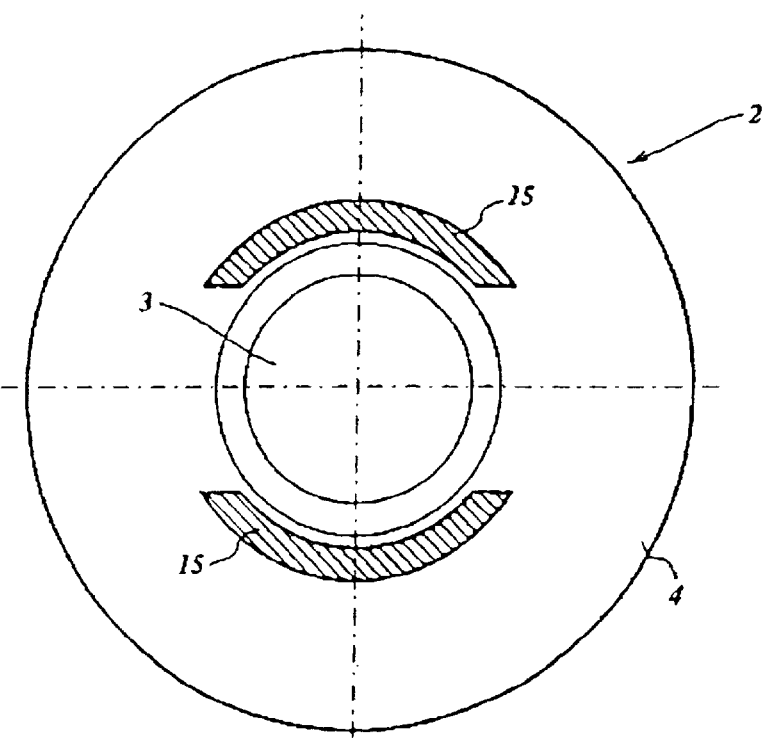
FIG. 5 is a sectional view of the housing along the line V—V in FIG. 1.
Figure 6:
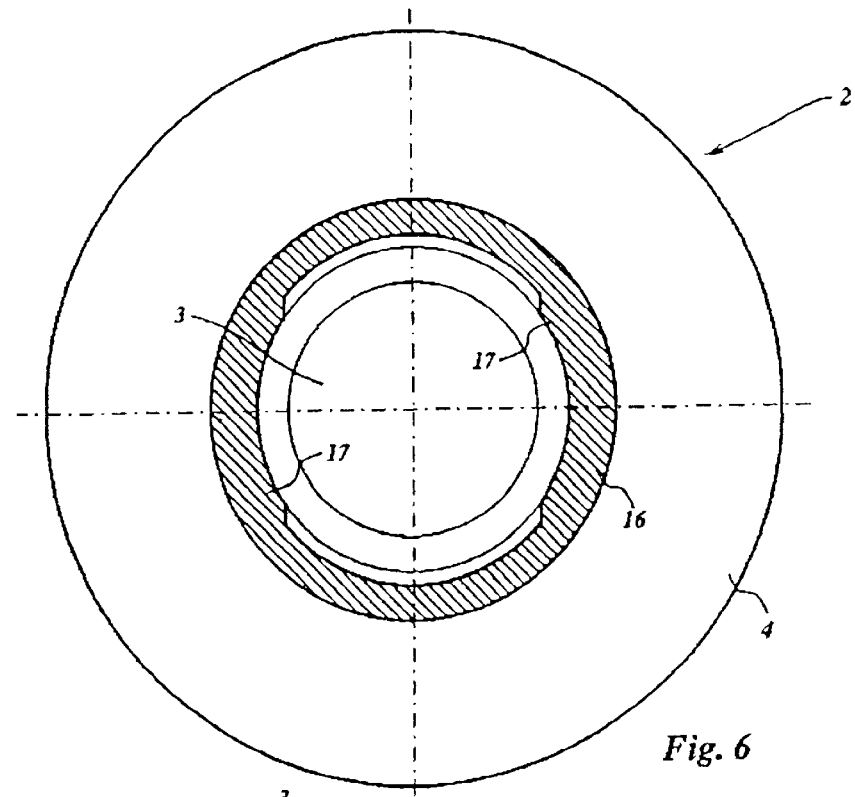
FIG. 6 is a sectional view of the housing along the line VI—VI in FIG. 1.

As is furthermore shown in the figures, two diametrically opposite arms 15 formed in one piece with the housing and extending downwardly from the flange 4 are fixed to the underside of the flange 4 of the housing 2. As is apparent in particular from FIG. 5, each of the arms 15 extends concentrically about the central axis of the housing 2, through an angle of about 120°, seen in sectional view.

A ring-shaped element 16 formed in one piece with the arms 15 is connected to the lower ends of said arms. The parts of the ring-shaped element 16 present between the parts of the ring-shaped element 16 to which the arms 15 connect are provided with diametrically opposite projections 17 projecting into the interior of the ring-shaped element. The facing boundary surfaces 17 of said projections slope conically upwards at their lower ends, whilst the remaining upper parts of said boundary surfaces extend concentrically about the central axis of the housing 2.

The upper part of the closing element 6 can be passed between the projections 17 into the passage 3 formed in the housing 2, as is indicated by the arrows A in FIG. 2, for the purpose of mounting the closing element 6 in the housing 2 of the closure. The construction is such that the diameter of at least the lowermost winding, seen in FIG. 2, abutting against the flange 10' is larger than the passage defined by the parts of the facing boundary surface of the projections 17 that extend concentrically about and parallel to the central axis of the housing 2. Upon movement of the spring 12 past said boundary surfaces of the projections 17, also the parts of the spring 12 that come into contact with said boundary surfaces can be resilient urged in inward direction and/or the projections 17 can be resiliently deformed in outward direction, for example through deformation of the arms 15 and/or of the ring-shaped element 16 so as to allow the spring 12 to move past the projections 17 in the direction of the passage 3. After the spring 12 has passed the projections 17 in its entirety, the resiliently deformed parts of the spring and/or of the parts 15, 16 and/or 17 will spring back to their original unloaded position, as a result of which the lowermost winding of the spring 12 will come to lie on top of the projections 17, some distance above the flange 10', as is shown in FIG. 3. In this position, the elastomeric element 7 is pressed firmly into abutment with its seat 8 by the spring 12. The resilient deformation is facilitated by the sloping configuration of the lower parts of the inner boundary surfaces of the projections 17.

In this position, the flange 10' is slidably accommodated in the ring-shaped element 16 with a tight fit. The ring-shaped element functions as a guide means for the closure upon opening and closing of the closure.

Furthermore, the flange 10' present within the ring-shaped element 16 prevents the liquid flowing into the keg from being squirted up through the ring-shaped element upon filling of the keg, which generally takes place with the keg in upside-down position. The liquid flowing into the keg is directly forced to flow away sideways so as to effect a gradual filling of the keg whilst preventing undesirably strong foaming.

Using a housing 2 of simple design, an easy and rapid fitting of the various parts in the housing can furthermore be effected by means of an effective confinement of the spring 12 between the flanged upper end 9 of the shell-shaped element 10 and the projections 17 forming a supporting element for the spring, which projections form part of the ring-shaped element 16.

The closure 1 built up in this manner can be inserted into the interior of a container 18 via a closable opening (not shown) in said container 18, after which the housing 2 can be passed through an opening 19 in the wall of the container in the direction indicated by the arrow B, as is shown in FIG. 3.

As is apparent from said FIG. 3, the wall portion of the container 18 surrounding the opening 19 is configured to correspond to the upper surface 5 of the flange 4, so that the flange 4 will abut against said bent wall portion of the container 18, as is apparent in particular from FIG. 1, so that the closure is properly supported against the inner wall of the container and locked against lateral movement.

In the embodiment that is shown in FIGS. 1–3, an internally threaded ring 20, which is screwed onto the externally threaded part of the housing 2 projecting from the container, is used for fixing the closure to the container.

As is shown in more detail in the figures, a groove 21, in which a sealing ring 22 is received, may be formed in the upper surface of the flange 4 for the purpose of effecting an extra good seal.

A tapping mechanism, by means of which the closure can be opened, can be connected to the upper end 2 of the housing, in a manner which is known per se, for the purpose of tapping pressurised liquid from the container. Since this arrangement is known per se, it need not be discussed in detail in the present disclosure.

Preferably, the housing 2 is made of plastic material in its entirety, as are the ring 20, the shell 10 and the down-tube 11, so that an inexpensive construction of the closure 1 can be realised. The wall portion of the container 18 surrounding the opening 19 can be pressed into the desired shape in a simple manner, and after the closure has been fitted in the container, for example via an open bottom, the container can be closed, using means and methods that are known. Thus, a low-cost container fitted with a closure which is suitable for single use can be obtained. Furthermore, the container is very safe, since the closure 1 cannot move out of the keg under the influence of the prevailing pressure in the keg, not even after the possible removal of the ring 20.

The closure that is shown in FIGS. 7 and 9 corresponds in large measure to the closure that has been discussed above with reference to FIGS. 1–3, and consequently parts corresponding to each other are indicated by the same reference numerals in the various figures.

Figure 8:
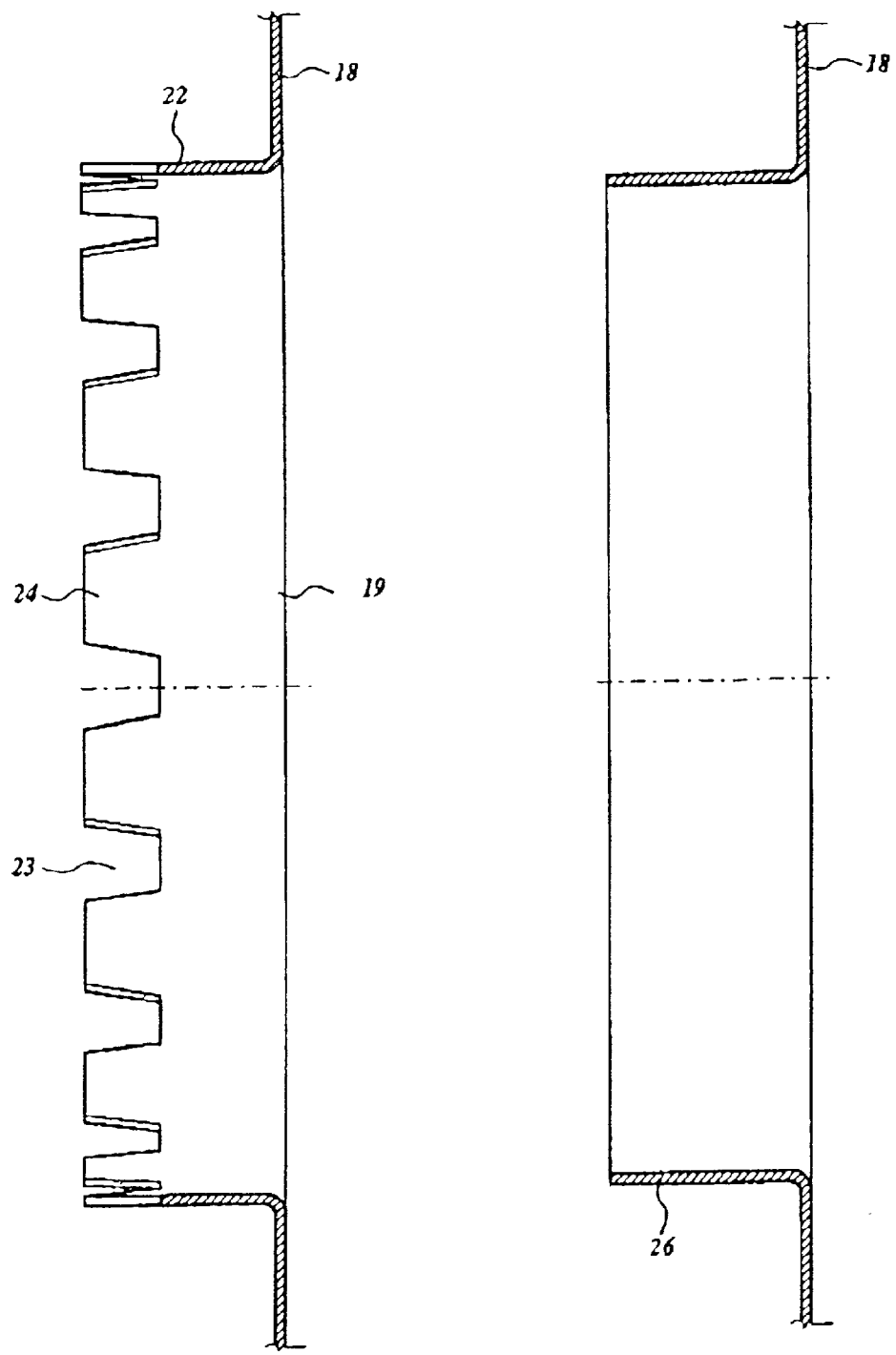
FIG. 8 is a larger-scale view of a part of the container of FIG. 7.

In the embodiments that is shown in FIG. 7, the container 18 is provided with an upright collar 22 joining the wall portion that surrounds the opening 19, in the free edge of which recesses 23 have been formed, thereby forming projecting lips 24 (FIG. 8). Furthermore, the outer circumference of the housing 2 is not provided with screw thread, but a circular groove 25 is formed in the outer circumference of the housing 2, which groove gradually deepens in a direction away from the flange 4.

After the housing 2 has been passed through the opening 19 in this embodiment, the lips 24 of the collar 22 are bent over in the direction of the housing 2, as a result of which they will be positioned in the circular groove 25, as is shown in dotted lines in FIG. 7, so as to fix the housing 2 to the container in this manner.

The embodiment that is shown in FIG. 9 corresponds in large measure to the embodiment that is shown in FIG. 7. This embodiment, however, does not employ a collar which is provided with recesses for the purpose of forming projecting lips, but a circular collar 26 as shown in FIG. 10, which can be pressed in whole or in part into the circular groove 25 formed in the housing by deformation thereof.

What is claimed is:

1. A closure for a container to be pressurised, comprising a housing to be fixed to the container, in which a passage is present, whilst a seat is arranged in said passage, which seat is intended to mate with a closing element, which is urged in the direction of the seat by means of a coil spring surrounding said closing element, said coil spring being confined between a part of the closing element and a few spaced-apart projections formed in one piece with the housing, which are connected to the remaining part of the housing by means of a few spaced-apart arms, said coil spring and said projections being capable of resilient deformation relative to each other, in such a manner that the spring can be moved past the projections in its position of use, characterized in that the closure is provided with two diametrically opposite projections formed on the inner circumference of a ring-shaped element being in one piece with said projections, which ring-shaped element is connected to the remaining part of the housing via two diametrically opposite arms located between the projections, seen in the direction of the central axis of the housing, whilst one end of the spring is directly supported on said projections.

2. A closure according to claim 1, characterized in that the facing boundary surfaces of the projections slope upwards from their free ends in the direction of the seat over part of their height.

3. A closure according to claim 1, characterized in that the coil spring has a conical configuration, in which the winding at the end of the coil spring remote from the seat is the largest winding of the coil spring.

4. A closure according to claim 1, characterized in that the closing element is provided with a shell-shaped member surrounded by the coil spring, which member includes a flange which is slidably accommodated with a tight fit in the ring-shaped element.

5. A closure according to claim 1, characterized in that the closing element is provided with a shell-shaped member surrounded by the coil spring, which shell-shaped member is provided with a flanged collar at its end facing towards the seat, against which one end of the coil spring abuts.

6. A closure according to claim 5, characterized in that the coil spring can be moved past the collar onto the shell-shaped member under resilient deformation of at least the coil spring that abuts against the collar in the mounted position of the coil spring.

7. A container comprising a housing of a closure present in an opening formed in the container and extending at least partially outside said container and mounted to said container, in which a closing element mating with a seat arranged in the centre of the housing is present, which closing element is accessible via the open upper end of the housing so as to be forced open by a tapping mechanism upon connection of the tapping mechanism to the container, characterized in that the housing of the closure is provided with a projecting flange at the end remote from the open upper end of the housing, whose boundary surface facing towards the open upper end of the housing extends at least in part away from said open upper end, seen in the direction of the outer circumference of the flange, wherein said boundary surface of the flange abuts against the inner side of the correspondingly configured wall portion surrounding the opening that is present in the container.

8. A container according to claim 7, characterized in that the part of the boundary surface that joins the housing extends at least substantially perpendicularly to the central axis of the housing, which part then blends into a part extending in a direction away from the open upper end.

9. A container according to claim 7, characterized in that the part of the housing extending outside the container is provided with a groove, into which the wall portions of the container bounding the opening in the container are pressed for the purpose of fixing the housing to the container.

10. A closure apparently intended for use in the container according to claim 7.

11. A closure according to claim 10, characterized in that the housing of the closure is made in one piece of plastic material.

* * * * *